United States Patent

Wold et al.

[11] Patent Number: 6,065,188
[45] Date of Patent: *May 23, 2000

[54] ERGONOMIC HANDLE FOR UTENSIL

[75] Inventors: Kevin L. Wold; Lance L. Hood, both of Seattle; Dennis M. Terenzio, Mercer Island, all of Wash.

[73] Assignee: Progressive International Corp., Kent, Wash.

[*] Notice: Under 35 U.S.C. 154(b), the term of this patent shall be extended for 114 days.

[21] Appl. No.: 08/688,991

[22] Filed: Aug. 1, 1996

[51] Int. Cl.[7] .................................................. A47J 45/00
[52] U.S. Cl. ...................... 16/430; 16/436; 16/DIG. 12; D8/107
[58] Field of Search ............................. 16/430, 436, 422, 16/DIG. 12, DIG. 19; 482/44, 49, 50, 62; 76/106, 119; D8/107; D7/688, 691, 368, 369, 393, 395; 82/177.1, 489

[56] References Cited

U.S. PATENT DOCUMENTS

| | | | |
|---|---|---|---|
| D. 104,484 | 5/1937 | Weinig | D8/107 |
| D. 149,677 | 5/1948 | Roblin | D7/395 |
| D. 165,917 | 2/1952 | Hampshire | D7/395 |
| D. 369,072 | 4/1996 | Huang | D8/107 |
| D. 373,904 | 9/1996 | Vanderhoef et al. | D7/395 |
| 1,960,255 | 5/1934 | Tyroff | D7/395 |
| 2,012,637 | 8/1935 | Ribley | 16/110 R |
| 2,317,349 | 4/1943 | Wolfers | D7/395 |
| 2,651,878 | 9/1953 | Webbeking | 16/110 R |
| 4,481,689 | 11/1984 | Westmoreland | D8/107 |
| 5,535,484 | 7/1996 | Gibson | 16/111 R |

FOREIGN PATENT DOCUMENTS 2274615  8/1994  United Kingdom ................. 16/110 R

*Primary Examiner*—Chuck Y. Mah
*Attorney, Agent, or Firm*—John R. Benefiel

[57] ABSTRACT

An elongated handle for a kitchen utensil is shaped for easy gripping having a slightly bulbous rear section and a forward and intermediate section of a rounded rectangular cross sectional shape, the intermediate section smaller than either the forward or rear sections to create an overall stretched hourglass handle shape. The bulbous rear section is inclined downwardly from the top of the handle to be positioned in the crook of the three encircling fingers gripping the handle, while the thumb rests on the flat surface of the depression formed by the intermediate section and the index finger wraps around the intermediate section to the rear of the enlarged forward section.

8 Claims, 2 Drawing Sheets

ERGONOMIC HANDLE FOR UTENSIL

BACKGROUND OF THE INVENTION

This invention concerns handles and more particularly hand-held utensils, particularly kitchen tools which are gripped with one hand and involve twisting motions of the wrist, or short crossways thrusts, or a combination of both motions.

Examples of such kitchen tools are peelers, paring knives, corers, spatulas, whisks, melon ballers, pizza wheels, etc.

Important considerations for an ergonomically proper handle design include the ease with which the handle can be gripped to minimize fatigue and improve the security of the grip. Also, the handle should allow a high degree of control over the movement of the tool.

Safety is an important consideration for sharp tools, i.e., the handle should minimize any contact of the user with the cutting edge.

Aesthetic appeal of the handle design particularly for kitchen tools is also an important consideration.

It is the object of the present invention to provide a handle for utensils which can be comfortably gripped when executing twisting and short stroking across the body of the user of a utensil, which lends itself to safe use of utensils having cutting edges, and which has considerable aesthetic appeal.

SUMMARY OF THE INVENTION

The above object and others which will be understood upon a reading of the following specification and claims are achieved by a handle having an elongated shape, formed with a slightly bulbous rear section which increases in diameter to a maximum and then decreases in diameter to the rounded end, a rounded rectangular forward section from which the tool shank projects, and an inwardly tapered intermediate section joining the rear and front sections to create a stretched hourglass handle shape.

The slightly bulbous rear section is mildly angled downwardly so as to be positioned in the crook of three encircling fingers while presenting a convex shape pressed to the palm of the hand, providing a superior grip in the user's hand. The intermediate and forward sections intuitively position the thumb, the rear taper of the intermediate section restraining the thumb from sliding forward as the tool head is manipulated.

The handle is preferably made of a molded dense plastic with a finely textured surface.

A hanging hole in the rear section is chamfered to assist in placing the handle on a peg and to blend the hole into the handle shape, to produce a pleasing appearance.

DETAILED DESCRIPTION

Figure 1:
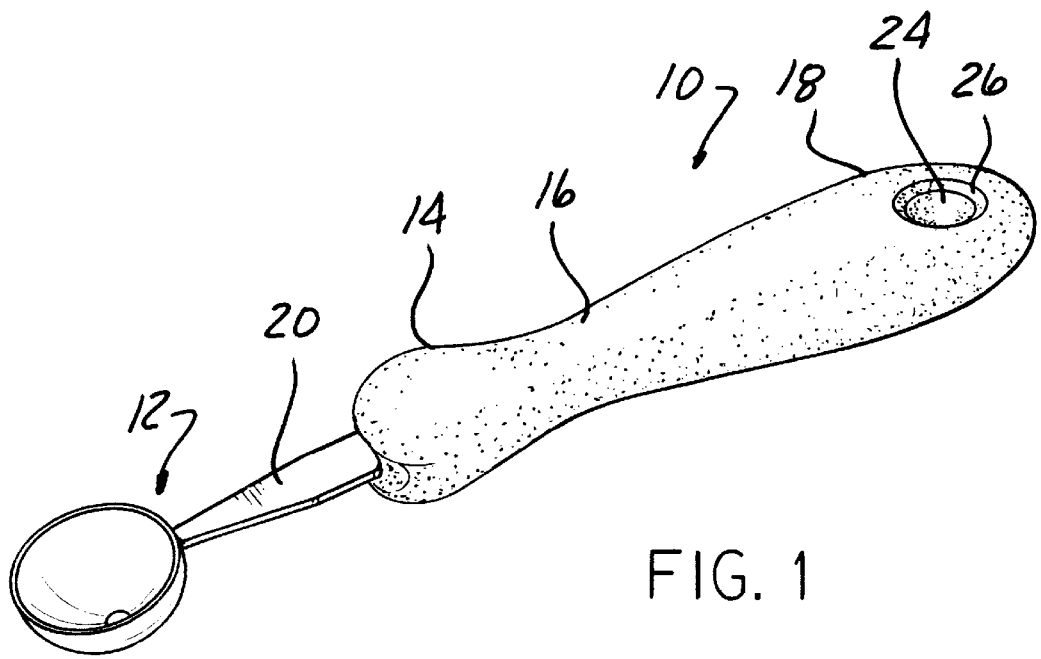
FIG. 1 is a perspective view of a handle according to the invention, shown with a representative tool head installed therein.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings and particularly FIGS. 1–4, the handle 10 is shown for illustrative purposes, a melon baller utensil 12 projecting from the forward end section 14 of the handle 10.

The handle 10 is elongated and is shaped with a stretched hourglass shape consisting of the forward end section 14 blended into an intermediate section 16 of smaller cross dimension, which blends into a larger rear end section 18.

The overall length of the handle 10 is on the order of five inches, with the rear end section 18 comprising a major share of that length, i.e., a length on the order of three inches.

The rear end section 18 is of a slightly bulbous shape due to its tapering from a minimum diameter to a maximum diameter at its approximate midpoint, and back to a minimum diameter to blend with the intermediate section 16.

The rear section 18 is of generally circular shape in section, gradually tapering down in either direction from its midpoint, as noted. In addition, the axis of the rear section 18 is inclined down slightly from the top of the handle 10, forming an angle with the axis of the tool head shank 20 and remaining sections of the handle 10. This "droop" thus formed is for improved ergonomic characteristics of the handle 10, as will be described below.

The forward section 14 is shaped to be a rounded rectangular square in section, curving to a flat front face 22 from which projects the shank 20 of the tool head 12. The shank 20 is typically configured as a thin blade which can be molded into the handle 10, suitable retention features (not shown) included as desired.

The rounded rectangular shape matches the rectangular blade of the tool head. The top of the forward section 14 is also thereby flattened for secure engagement with a user's thumb.

The forward section 14 is generally smaller in its transverse dimension than the rear section 18, the forward section 14 forming a rounded rectangular shape approximately 1⅓ inches across and 13/16 of an inch deep. The rear section 18 is generally circular in section of a maximum diameter approximately equal to the width of the forward handle, i.e., 1⅛ inches in diameter.

The intermediate section 16 forms a transition from the rounded rectangular shape of the forward section 14 to the round rear section 18 smoothly blending into each of those sections.

The intermediate section 16 is of smaller transverse dimensions than each of the forward sections 14 and the rear section 18 to form a shape resembling a stretched hourglass. In the actual embodiment shown, the intermediate section is approximately 19/32ths of an inch deep and 27/32nds of an inch wide.

The handle 10 is of molded plastic construction, with SANTOPRENE™, a high density neoprene advantageously selected as the material from which the handle 10 is molded.

A hang hole 24 is formed adjacent the rear end of the handle 10, extending from top to bottom and having a flared chamfer 26 on either side. The chamfer 26 guides a peg or hook into the hole 24 for easier hanging, and also softens the appearance of the hole 24.

Figure 5:
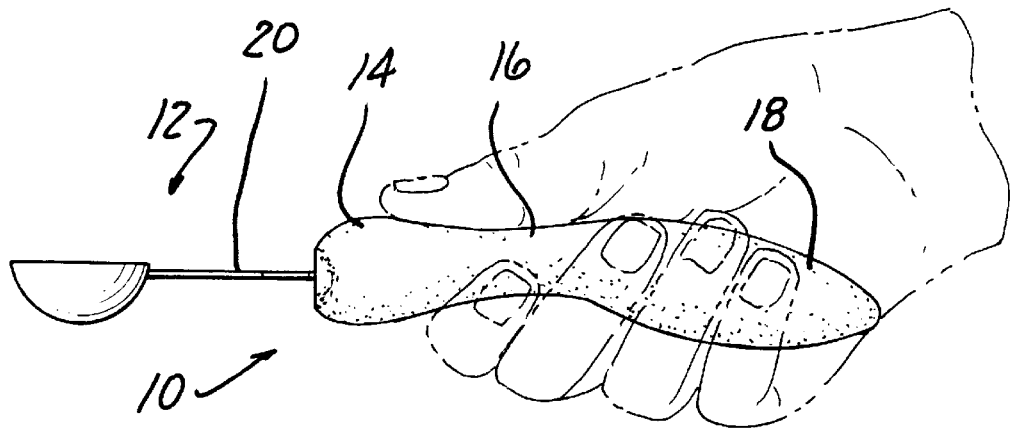
FIG. 5 is a perspective view of a handle being gripped by the hand of a user as intended.
Figure 2:
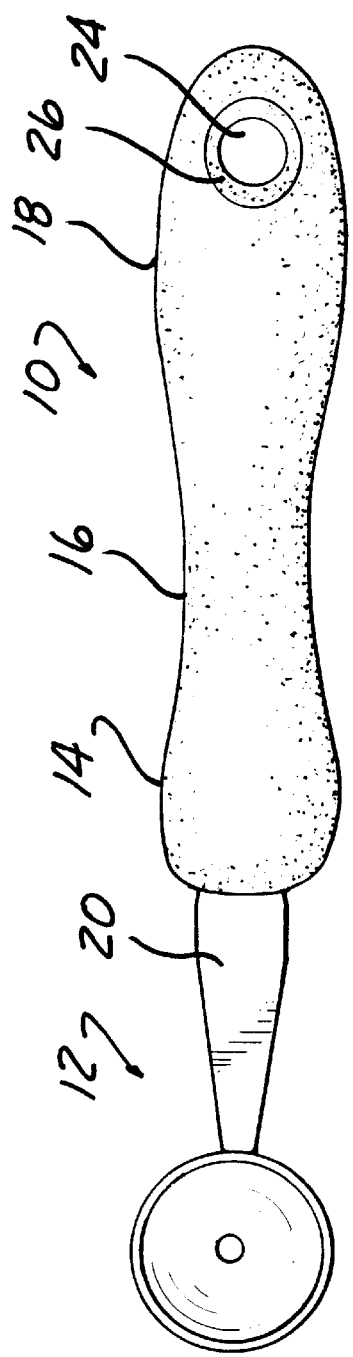
FIG. 2 is a plan view of the handle and tool shown in FIG. 1.
Figure 3:
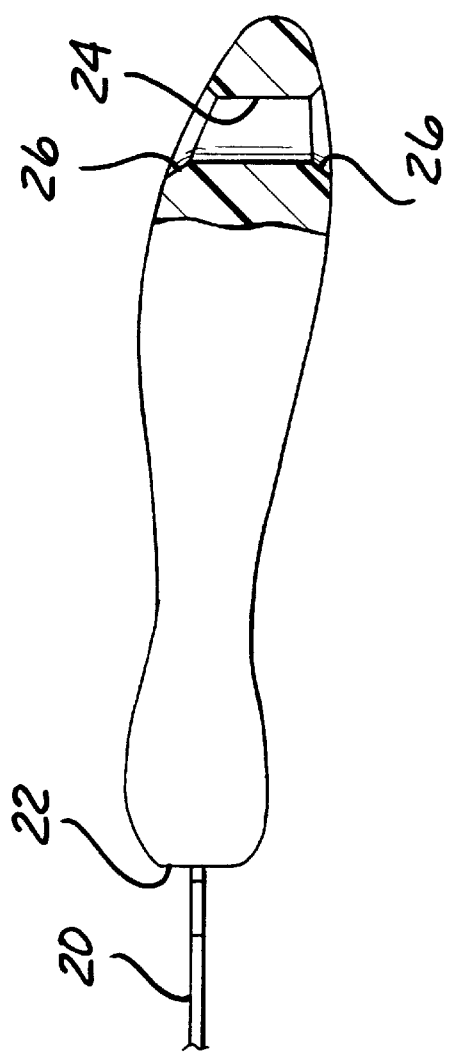
FIG. 3 is a side elevational partially sectional view of the handle shown in FIGS. 1 and 2.
Figure 4:
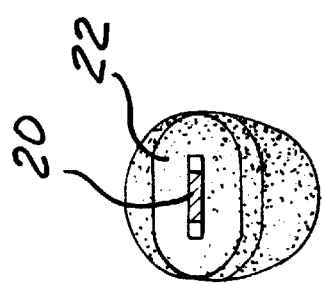
FIG. 4 an end view of the handle shown in FIGS. 1–3, with the fragmented tool head.

Referring to FIG. 5, the ergonomic qualities of the handle 10 can be understood. The thumb of the user naturally rests in the flattened depression formed by the intermediate section 16, the enlarged top of the forward section 14 tending to prevent forward movement of the thumb towards the tool 12.

The little, ring, and middle fingers encircle the rear section 18. The increased diameter of the rear section provides easy grasping by those fingers. The rear section 18 being angled down from the top or thumb side of the handle 10 is positioned in the crooks of those three fingers for easier gripping.

The opposite side of the rear section 18 is in position to be held against the palm of the user's hand, to provide with the finger encirclement a secure grasping of the handle.

The proper grip has been found to be intuitively assumed by a user and allows effective hand and arm motions for a variety of tools. These include paring knives, peelers, zesters, corers, spatulas, whisks, manual can openers, melon ballers, and pizza wheels.

The handle 10 is usable equally effectively in either the right or left hand of the user.

The handle 10 is most effective for utensils that are used with the hand turned with the palm facing sideways rather than with the palm down. Twisting or forward stroking motions crossways to the user's body can easily be executed in this position.

Straight ahead and longer slicing motions are more awkward and thus use with slicing knives is not the preferred application of the handle according to the invention.

The smoothly contoured handle shape also has a distinctive, attractive appearance.

We claim:

1. A hand-held utensil comprising:

a tool head;

an elongated handle having said tool head mounted thereto to project from a forward end of said handle;

said handle having a forward section adjacent said forward end and a slightly bulbous rear section of a length and diameter to be easily grasped between the palm of the hand and the middle, ring, and little fingers partially encircling said rear section, said rear section having a larger cross sectional area than said forward section of said handle, said handle also having an intermediate section of smaller cross sectional area than both said forward and rear sections and smoothly blended into the contours of each to create a stretched hourglass handle shape;

said forward and intermediate sections of said handle each having flattened sides and aligned to establish a longitudinal axis aligned with said tool head, and wherein said rear section is slightly angled down from said longitudinal axis of said handle.

2. The utensil according to claim 1 wherein said rear section is round in cross section, tapering up from said intermediate section to a maximum diameter and thereafter tapering down to a rounded end.

3. The utensil according to claim 2 wherein said maximum diameter of said rear section is about 1⅛ inches.

4. The utensil according to claim 3 wherein said forward, intermediate, and rear sections have a combined length of about five inches and the length of said rear section is about three inches.

5. The utensil according to claim 1 wherein said rear section is formed with a through hang hole adjacent the rear end thereof, a chamfer extending around said hole on either side of said rear section.

6. The utensil according to claim 1 wherein said forward and intermediate sections have a rounded rectangular cross sectional shape being slightly wider than deep.

7. The utensil according to claim 1 wherein said rear section is inclined on the order of 10° down from said longitudinal axis of said handle.

8. The utensil according to claim 1 wherein said tool head has a rectangular in section blade which projects from a generally rectangular front face of said handle forward face.

* * * * *